United States Patent [19]

Sebzda, Sr.

[11] Patent Number: 4,924,051

[45] Date of Patent: May 8, 1990

[54] SPLIT GRIP TIP FOR MOUNTING OF ELECTRODE BLANKS

[76] Inventor: Jack Sebzda, Sr., 7 Schuyler Ave., Pequannock, N.J. 07440

[21] Appl. No.: 272,938

[22] Filed: Nov. 18, 1988

[51] Int. Cl.[5] .......... B23H 1/04

[52] U.S. Cl. .......... 219/69.15; 279/2 R

[58] Field of Search .......... 219/69.15, 69.11; 279/2 R

[56] References Cited

U.S. PATENT DOCUMENTS

| | | | |
|---|---|---|---|
| 1,427,155 | 8/1922 | haven | 279/2 R |
| 2,656,190 | 10/1953 | Towle | 279/2 R |
| 2,966,361 | 12/1960 | Phillips | 279/2 R |
| 3,534,480 | 10/1970 | Webb | 279/2 R |
| 3,741,573 | 6/1973 | Treer | 279/81 |
| 3,796,852 | 3/1974 | Vlach | 219/69.15 |
| 3,855,442 | 12/1974 | Check et al. | 219/69.15 |
| 4,013,862 | 3/1977 | O'Connor | 219/69.15 |
| 4,020,313 | 4/1977 | Koga et al. | 219/69.15 |
| 4,245,144 | 1/1981 | Wittenstein et al. | 219/69.15 |
| 4,292,866 | 10/1981 | Kaczynski | 279/2 R |
| 4,449,027 | 5/1984 | Fujikawa | 219/69.15 |
| 4,647,748 | 3/1987 | Glassman | 219/69.15 |
| 4,654,498 | 3/1987 | Sato | 219/69.15 |
| 4,713,515 | 12/1987 | Choi | 219/69.15 |
| 4,717,803 | 1/1988 | Alexandersson | 219/69.15 |

OTHER PUBLICATIONS

"Increasing the Productivity of Your EDM Department", by Sebzda, *EDM Digest*, 12/1983, pp. 15–19 and 22.

*Primary Examiner*—M. H. Paschall

*Assistant Examiner*—Geoffrey S. Evans

*Attorney, Agent, or Firm*—Fleit, Jacobson, Cohn, Price, Holman & Stern

[57] ABSTRACT

An expandable, grip tip having a head with a knurled peripheral surface is expanded within a predrilled opening in a graphite electrode blank to secure the grip tip to the electrode blank. The grip tip is then mounted in an electrode shank, with the electrode blank flush against the end of the shank to seal off dielectric fluid. To enable the mounting of the electrode blank onto the shank, the grip tip is locked in a loading fixture and the electrode blank mounted on the knurled head of the grip tip. A projection on the loading fixture recesses the knurled head of the grip tip from an end face of the electrode blank. When mounting the grip tip and electrode blank onto the shank, there is always a space between the end of the shank and the knurled head of the grip tip. This ensures that the electrode blank is mounted squarely and flush against the end of the shank.

17 Claims, 2 Drawing Sheets d
34
76
74
24
70
56
72 d
62
54
55
60
50
10
80
70
82
78
84 d
34
76
74
24
56
72
70

80
20
22
18
70
24

SPLIT GRIP TIP FOR MOUNTING OF ELECTRODE BLANKS

FIELD OF THE INVENTION

The present invention includes a split grip tip for mounting an electrode blank on an electrode holding shank.

BACKGROUND OF THE INVENTION

Prior practices for the fixing of a graphite electrode blank at the end of an electrode holding shank, such as a Model 3R-322/50 shank, available from System 3R USA, Inc., Pompton Plains, N.J., have included gluing or press fitting of the electrode blank onto the shank, bolting the electrode blank onto the shank, and securing the electrode blank onto the shank with screws. These practices are time-consuming and may not always assure a proper mounting of the electrode blank on the shank.

After mounting of the electrode blank on the shank, the shank is mounted in a clamping device, such as a Mini-Block, available from System 3R USA, Inc., Pompton Plains, N.J. The electrode blank is then machined to a desired electrode shape for electrical discharge machining.

Additional methods of mounting an electrode blank on an electrode holder are disclosed in U.S. Pat. Nos. 3,796,852 to Vlach; 4,713,515 to Choi; 4,654,498 to Sato; 3,855,442 to Check et al.; 4,013,862 to O'Connor; 4,020,313 to Koga et al.; and 4,449,027 to Fujikawa.

The Vlach patent discloses a method and apparatus for machining a cavity within a workpiece by electrical discharge machining with a tool having a replaceable electrode tip. The tool includes a positioning member, a holder, a stem attached to the holder, and a tip secured to the stem. During EDM, which produces a cavity, the tip erodes and becomes worn, necessitating replacement. When the electrode tip has become worn, the stem and holder are moved away from the workpiece to permit replacement of the worn tip with a new tip. While the tip is being replaced, the alignment of the stem with respect to the workpiece remains unchanged, and the new tip is automatically aligned with the partial cavity already machined. The tip of the stem includes a split extension which receives a tapered set screw to force the two elements of the split extension to extend laterally. During lateral movement, the elements of the split extension bear against the sides of a central portion of the tip and secures the tip to the split extension.

SUMMARY OF THE INVENTION

By the present invention, an expandable, grip tip having a head with a knurled peripheral surface is expanded within a predrilled opening in a graphite electrode blank to secure the grip tip to the electrode blank. The grip tip is then mounted in an electrode shank, with the electrode blank flush against the end of the shank to seal against the leaking of dielectric fluid while it is being force fed through the electrode for flushing purposes. To enable the mounting of the electrode blank onto the shank, the grip tip is locked in a loading fixture and the electrode blank mounted on the knurled head of the grip tip. A projection on the loading fixture provides a predetermined setback of the knurled head of the grip tip from the electrode blank so that the grip tip, when the electrode blank is mounted on it, is recessed from an end face of the electrode blank. Therefore, when the grip tip and electrode blank are mounted onto the shank, there is always a space between the end of the shank and the knurled head of the grip tip. This ensures that the electrode blank is mounted squarely and flush against the end of the shank to prevent the leaking of dielectric fluid while it is being pressure fed through the electrode for flushing purposes.

It is an object of the present invention to provide a split grip tip for mounting of a graphite electrode blank on the end of an electrode mounting shank.

It is another object of the present invention to provide a split grip tip for mounting of a graphite electrode blank on the end of an electrode mounting shank by first fixing the grip tip in a loading fixture and then securing the electrode blank to the grip tip, releasing the grip tip and electrode blank from the loading fixture and securing the grip tip with the electrode blank on the shank.

It is yet another object of the present invention to provide an electrode mounting kit including an electrode holding shank, a loading fixture, and a grip tip.

It is still yet another object of the present invention to provide an electrode mounting kit including an electrode holding shank, a loading fixture, and a grip tip, and the grip tip including a knurled head which is split into four sections and is capable of radially outward divergence for engaging and gripping a graphite electrode blank to securely mount the graphite electrode blank on the end of the shank by securing the grip tip within the shank.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
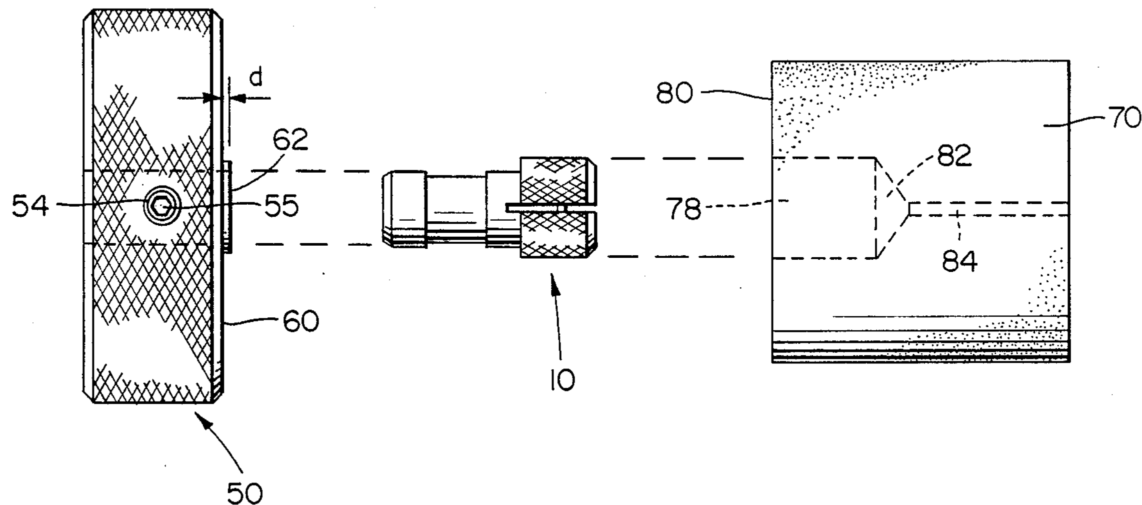
FIG. 1 is an exploded view of a loading fixture, grip tip, and graphite electrode blank.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 6:
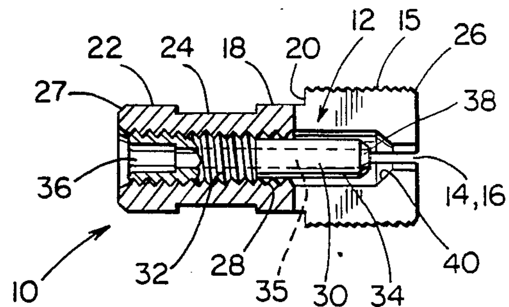
FIG. 6 is a sectional view of a grip tip with an internal set screw.
Figure 7:
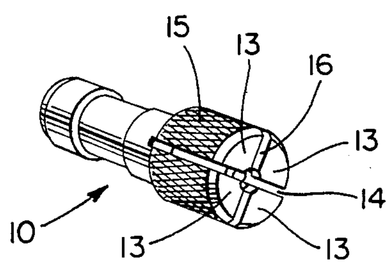
FIG. 7 is a perspective view of a grip tip.

With reference to the drawings in general, and to FIGS. 6 and 7 in particular, an expanding grip tip embodying the teachings of the subject invention is generally designated as 10. Grip tip 10 is a hollow, elongated cylindrical body. The head 12 of the grip tip is of a cylindrical configuration and includes a knurled peripheral surface 15. The knurled surface includes crisscrossing grooves extending transverse to the longitudinal axis and transverse axis to form a gripping surface for securing a graphite electrode blank to the grip tip. The outside diameter of the head 12, after knurling, is approximately ½ inch. Head 12 is divided into four sections 13 by two perpendicular and intersecting grooves 14, 16 passing through the center of the head. Grooves 14, 16 are 1/32-inch wide×7/16-inch deep.

The head portion 12 is separated from an annular shoulder 18 by a radially extending surface 20. Spaced between shoulder 18 and another annular shoulder 22 is undercut portion 24 having a lesser diameter than the diameter of shoulders 18 and 22. At the end of head portion 12 is a 1/32-inch×45° chamfer 26 to aid in the insertion of the grip tip head into a hole of a graphite electrode blank. The length of the head is approximately ⅜ -inch, with the length of shoulder 18 being 11/64-inch, the length of undercut 24 being 5/16-inch, and the length of shoulder 22 being 13/64-inch. A 1/32-inch×45° chamfer 27 is located at the end of shoulder 22 to aid in the insertion of the grip tip into a hole of an electrode holding shank. The diameter of shoulder portions 22 and 18 are 0.375 inch and the diameter of undercut 24 is 0.355 inches.

Figure 2:
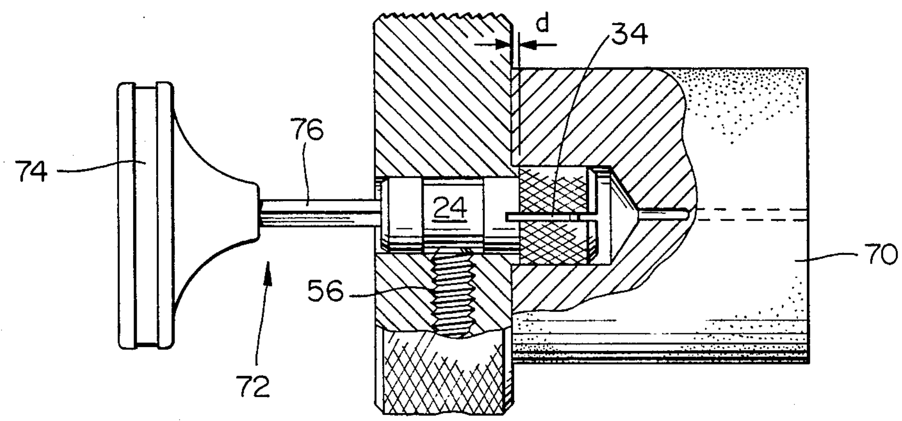
FIG. 2 illustrates the mounting of a grip tip within an opening of a graphite blank electrode blank when the grip tip is secured in a loading fixture.

The interior of the grip tip is hollow and includes internal threads 28 of M6 thread formed by a No. 8 tap drill extending within shoulders 18 and 22 and undercut 24 for receipt of an internal set screw 30 made of stainless steel and having threaded portion 32 and cylindrical portion 34. Set screw 30 is hollow and includes a recess 36 shaped to receive an allen wrench tool (such as is shown in FIG. 2) for rotation of the set screw 30. Upon rotation of the set screw, threaded portion 32 is driven along the internal threads 28 of the grip tip. The leading edge 38 of the set screw 30, tapered at an angle of 45°, is moved to engage with the tapered abutment surface 40 of the portions 13 of the knurled head 12 and causes outward divergence of the four sections 13 of the head 12 due to the elasticity of the brass material forming the grip tip. A flushing opening 35 is shown in dotted lines extending through the set screw 30.

Figure 5:
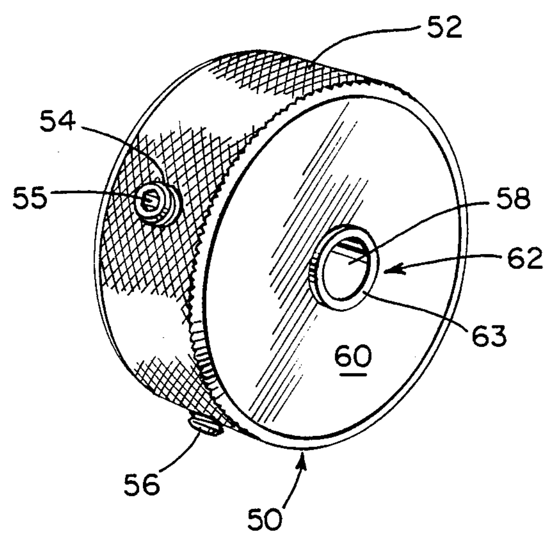
FIG. 5 is a perspective view of a grip tip loading fixture.

Grip tip loading fixture 50, shown in FIG. 5, is cylindrical in shape, having a knurled outer surface 52 and having two radially extending set screws 54 and 56 spaced 90° apart, which extend through radially extending bores (not shown) in the loading fixture. The radially extending bores extend from the knurled surface 52 to a central opening 58. Set screws 54 and 56 are M6-type set screws. The diameter of central opening 58 is slightly greater than the diameter of shoulders 18 and 22 of the grip tip 10. Surrounding the central opening 58, and projecting above flat side surface 60 of the loading fixture, is annular projection ring 62. The outside diameter of the projection ring 62 is less than the diameter of the knurled head 12 of the grip tip 10. The function of the projection 62 will be explained in further detail with reference to FIG. 2. For now, it is only necessary to state that projection 62 extends approximately 0.020 inches above flat side surface 60.

Figure 3:
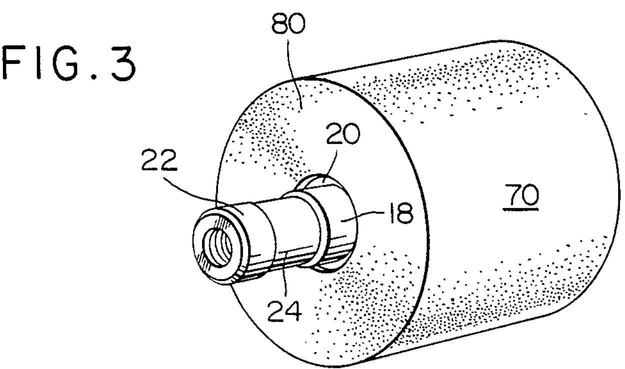
FIG. 3 is a perspective view of a grip tip mounted within a graphite electrode blank.

For mounting an electrode blank 70 onto the grip tip 10, as is shown in FIG. 3, reference is first made to FIGS. 1 and 2. Initially, set screws 54 and 56 are moved radially outward from loading fixture 50 by insertion of an allen wrench tool into opening 55 in the end of the respective set screws 54, 56. A tool 72 having handle 74 and hexagonal steel shank 76, as shown in FIG. 2, may be used. By the radially outward movement of the set screws 54, the screws are moved out of the central opening 58 of the loading fixture.

The annular shoulders 22 and 24 and undercut 24 of grip tip 10 are then loosely inserted into the central opening 58 until radially extending surface 20 rests on the uppermost surface 63 of annular projection ring 62. Knurled head 12 projects radially beyond the outermost periphery of the annular projection ring 62.

Holding knurled head 12 against projection ring 62, set screws 54 and 56 are moved radially inwardly by the allen wrench tool 72 to engage against the undercut 24 of the tip grip 10 located within central opening 58. In FIG. 2, set screw 56 is shown engaging undercut portion 24 of grip tip 10. The grip tip is thereby locked in place in the loading fixture 50. In the event of overpressure of the set screws against the undercut 24, the curved surface of the undercut 24 will be slightly deformed to a flattened condition. However, since only the undercut portion is deformed, which is recessed from shoulders 22 and 24, subsequent sliding of the grip tip out of the loading fixture and into an opening of an electrode holding shank will be unaffected. This will be explained in more detail with reference to FIG. 4.

After grip tip 10 is secured within loading fixture 50, a graphite electrode blank 70 having a predrilled central hole 78 of a ½-inch diameter and ½-inch deep is slipped over the knurled head 12 of the grip tip 10 until the bottom surface 80 of the electrode blank is flush with the flat side face 60 of the loading fixture. The electrode blank 70 includes a tapered hole portion 82 extending from cylindrical central hole 78 and connecting with axial passage 84. This provides a flushing opening through the electrode blank.

The use of the loading fixture ensures that the electrode blank will be securely mounted squarely on an end of an electrode holder shank. This is because the annular projection ring 62 projects above the flat side surface 60 by a distance d equal to 0.020 inches, shown in FIGS. 1 and 2. Therefore, the radially extending surface 20 of the grip tip 10 contacts the uppermost surface 63 of ring 62 and recesses the radially extending surface 20 from the bottom surface 80 of the electrode blank 70, as shown in FIG. 3. Projection ring 62 has a diameter of 15/32-inch.

Internal set screw 30 is then moved axially through grip tip 10 towards head 12 by rotation of tool 72, while the electrode blank is held against the flat side surface 60 of the loading fixture 50. Axial movement of the set screw 30 causes the tapered leading edge 38 located at the terminal end of the cylindrical portion 34 of the set screw 30 to engage with the tapered abutment surface 40 of sections 13 of knurled head 12. The continued axial movement of the set screw 30 causes the head sections 13 to move radially outwardly so that the knurled exterior surface 15 of the head 12 engages and bites into the walls of the central hole 78 of the electrode blank.

Set screws 54 and 56 of the loading fixture are then moved radially outwardly so as to release the grip tip 10 from the loading fixture. The grip tip is now securely locked within the electrode blank 70, as shown in FIG. 3.

Figure 4:
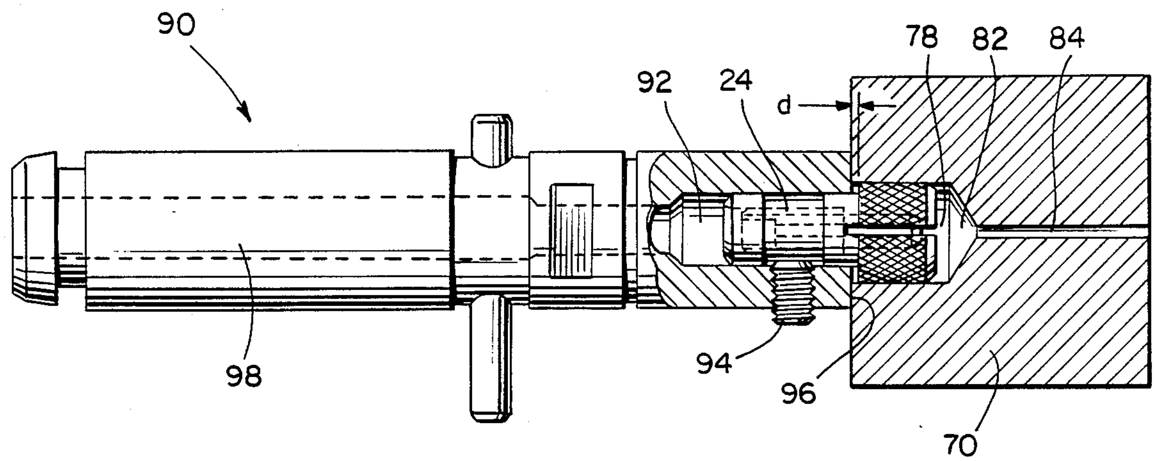
FIG. 4 is a side, partial sectional view of an electrode blank mounted on a grip tip which is secured within an electrode holding shank.

The electrode blank 70 is then mounted onto an electrode holder shank 90, as shown in FIG. 4. The electrode holding shank may be one available from System 3R U.S.A., Model No. 322/50, modified to accept the grip tip 10. A ⅜-inch diameter hole 92 having a depth of $\frac{7}{8}$-inch is formed at one end of the shank. Two M6 set screws 94, 8 mm in length, are threadingly mounted in holes extending from the exterior of the shank and connecting with hole 92. For purposes of clarity, only set screw 94 is shown, it being understood that another set screw, offset by 90°, similarly extends from the exterior of the shank to hole 92. The positioning of the holes through which the set screws radially move is set so that when the end of grip tip 10 having shoulders 18 and 22 and undercut 24 is slid into hole 92 such that the bottom surface 80 of electrode blank 70 is flush against the top surface 96 of the shank 90, the set screws will, upon radially inward movement, engage with undercut portion 24 of the grip tip 10. Grip tip 10, and thus electrode blank 70, is securely mounted upon the end of shank 90 by the tightening of the set screws 94.

During usage, flushing of dielectric fluid is accomplished through axial passage 98, which extends through shank 90 into hole 92, continuing through hollow internal set screw 30 to holes 78 and 82 of the electrode blank, and connecting with passageway 84. The electrode blank is used for a predetermined period of time, after which a new electrode blank is easily and rapidly mounted on the end of the electrode holder shank by reversing the steps described for the mounting of the electrode blank 70 on the shank 90 so as to remove the blank 70 from the shank 90 and then from the grip tip 10 and thereafter mounting a new electrode blank on the grip tip 10 held in the loading fixture, which is in turn removed from the loading fixture secured to a new electrode blank, and mounted at the end of the electrode holding shank.

Having described the invention, many modifications thereto will become apparent to those skilled in the art to which it pertains without deviating from the spirit of the invention, as defined by the scope of the appended claims.

I claim:

1. A grip tip for mounting an electrode blank onto an electrode holding shank, said grip tip comprising:

an elongated cylindrical body having a knurled head for engaging and gripping a smooth-walled bore of an electrode blank, said body being split by axially and radially extending grooves into a plurality of sections, and said body being hollow and internally threaded, and an internal set screw being threadingly mounted in said internal threads of said body for rotation and movement along a longitudinal axis of said body to engage and force radially outwardly said plurality of sections of said knurled head, said set screw being hollow for passage of dielectric fluid therethrough.

2. A grip tip as in claim 1, wherein a portion of said body extends from said knurled head having a diameter less than said knurled head.

3. A grip tip as in claim 2, wherein said portion includes two annular shoulders separated by an undercut portion of lesser diameter than said two annular shoulders.

4. A grip tip as in claim 3, wherein one of said two annular shoulders is located adjacent to said knurled head and is connected to said knurled head by a radially extending surface.

5. A grip tip as in claim 4, wherein said body is made of brass.

6. A grip tip as in claim 4, wherein there are four sections of said knurled head.

7. A kit for mounting a graphite electrode blank on an electrode holding shank, said kit comprising:

a grip tip having a hollow, elongated cylindrical body with a knurled head split by axially and radially extending grooves into a plurality of sections, said body being internally threaded and an internal set screw being threadingly mounted in said internal threads of said body for rotation and movement along a longitudinal axis of said body towards said knurled head to engage and force radially outwardly said plurality of sections of said knurled head, a loading fixture having means for releasably securing said grip tip to hold said grip tip while an electrode blank is secured to or released from said grip tip by movement of said internal set screw, and an electrode holding shank having means for releasably securing said grip tip so that when an electrode blank is secured to said grip tip, the electrode blank is held at an end of said electrode holding shank.

8. A kit as in claim 7, wherein said internal set screw is hollow.

9. A kit as in claim 7, wherein said grip tip includes two annular shoulders separated by an undercut portion and one of said two annular shoulders being located adjacent to said knurled head and connected to said knurled head by a radially extending surface.

10. A kit as in claim 9, wherein said means of said loading fixture and said means of said electrode holding shank engage said undercut portion when said grip tip is mounted in said loading fixture and said electrode holding shank, respectively.

11. A kit as in claim 7, wherein said loading fixture includes an annular projection surrounding a central opening to space said knurled head from an end face of the electrode blank during securing of the electrode blank to said grip tip.

12. A kit as in claim 7, wherein said electrode holding shank includes a hole at one end for receipt of said grip tip so as to mount an end face of the electrode blank held by said grip tip against said one end.

13. An EDM tool comprising:

an electrode holding shank having an axially extending hole extending from an end face, a graphite electrode blank having an end face mounted flush against said end face of said electrode holding shank, a grip tip mounted in said axially extending hole of said electrode holding shank and in a predrilled hole axially extending from said end face of said graphite electrode blank, said grip tip including a knurled head split into a plurality of sections and having means for radially outwardly expanding said knurled head in said predrilled hole of said graphite electrode blank, and said electrode holding shank including means for releasably securing said grip tip mounted in said axially extending hole of said electrode holding shank.

14. An EDM tool as in claim 13, wherein said grip tip includes an internal set screw axially movable within said grip tip.

15. An EDM tool as in claim 14, wherein said grip tip includes two annular shoulders separated by an undercut portion and one of said two annular shoulders being located adjacent to said knurled head and connected to said knurled head by a radially extending surface.

16. An EDM tool as in claim 15, wherein there are four sections of said knurled head.

17. An EDM tool as in claim 16, wherein said body is made of brass.

* * * * *